(12) United States Patent
Wu et al.

(10) Patent No.: US 12,487,485 B2
(45) Date of Patent: Dec. 2, 2025

(54) DISPLAY MODULE AND PREPARATION METHOD THEREFOR, AND DISPLAY APPARATUS

(71) Applicants: Beijing BOE Optoelectronics Technology Co., Ltd., Beijing (CN); BOE Technology Group Co., Ltd., Beijing (CN)

(72) Inventors: Xiaojuan Wu, Beijing (CN); Jinshuai Duan, Beijing (CN); Jiaxing Wang, Beijing (CN); Cuiyu Chen, Beijing (CN); Feng Liu, Beijing (CN); Dawei Feng, Beijing (CN); Zhiqiang Yu, Beijing (CN); Ning Wang, Beijing (CN); Danxing Hou, Beijing (CN); Mingjing Liu, Beijing (CN); Yichi Zhang, Beijing (CN)

(73) Assignees: Beijing BOE Optoelectronics Technology Co., Ltd., Beijing (CN); Beijing BOE Technology Development Co., Ltd., Beijing (CN)

( * ) Notice: Subject to any disclaimer, the term of this patent is extended or adjusted under 35 U.S.C. 154(b) by 0 days.

(21) Appl. No.: 18/278,010

(22) PCT Filed: Nov. 16, 2022

(86) PCT No.: PCT/CN2022/132192
§ 371 (c)(1),
(2) Date: Aug. 21, 2023

(87) PCT Pub. No.: WO2024/103282
PCT Pub. Date: May 23, 2024

(65) Prior Publication Data
US 2025/0076700 A1    Mar. 6, 2025

(51) Int. Cl.
*G02F 1/1335*    (2006.01)

(52) U.S. Cl.
CPC .............................. *G02F 1/133504* (2013.01)

(58) Field of Classification Search
CPC ............. G02F 1/133504; G02F 1/1333; G02F 1/1334; G02F 1/1335; G02F 1/13718; G09G 3/34
See application file for complete search history.

(56) References Cited

U.S. PATENT DOCUMENTS

2003/0063242 A1    4/2003 Nishimura et al.
2003/0067571 A1    4/2003 Lowe
(Continued)

FOREIGN PATENT DOCUMENTS

| CN | 1405609 A | 3/2003 |
|----|-----------|--------|
| JP | 2003005166 A | 1/2003 |

*Primary Examiner* — Kevin Quarterman
(74) *Attorney, Agent, or Firm* — Ling Wu; Stephen Yang; Ling and Yang Intellectual Property

(57) ABSTRACT

Embodiments of the present disclosure provide a display module and a preparation method therefor, and a display apparatus. The display module includes a liquid crystal display panel and a light scattering layer. Among them, the liquid crystal display panel includes a first substrate, a second substrate, and a first liquid crystal layer, the first substrate is disposed opposite to the second substrate, the first liquid crystal layer is located between the first substrate and the second substrate, and the first liquid crystal layer includes a cholesteric liquid crystal configured to have a conical helix texture when an electric field is applied, to reflect light matched with a helical pitch of the conical helix texture; and the light scattering layer is disposed on a side of the liquid crystal display panel and is configured to scatter light reflected by the liquid crystal display panel.

11 Claims, 7 Drawing Sheets

(56) References Cited

U.S. PATENT DOCUMENTS

| | | | |
|---|---|---|---|
| 2015/0372064 A1* | 12/2015 | Kim | G02F 1/13718 349/33 |
| 2018/0024404 A1* | 1/2018 | Suzuki | H10K 59/38 362/84 |
| 2018/0149916 A1* | 5/2018 | Hwang | G02F 1/133528 |
| 2019/0377226 A1* | 12/2019 | Koo | G02F 1/133504 |
| 2021/0018791 A1* | 1/2021 | Chen | G02F 1/133504 |
| 2021/0072570 A1* | 3/2021 | Abdulhalim | G02B 5/3083 |
| 2021/0149255 A1* | 5/2021 | Sato | G02F 1/133788 |
| 2021/0255497 A1* | 8/2021 | Yanai | G02B 5/02 |
| 2023/0176444 A1* | 6/2023 | He | G02B 27/0172 348/78 |

* cited by examiner

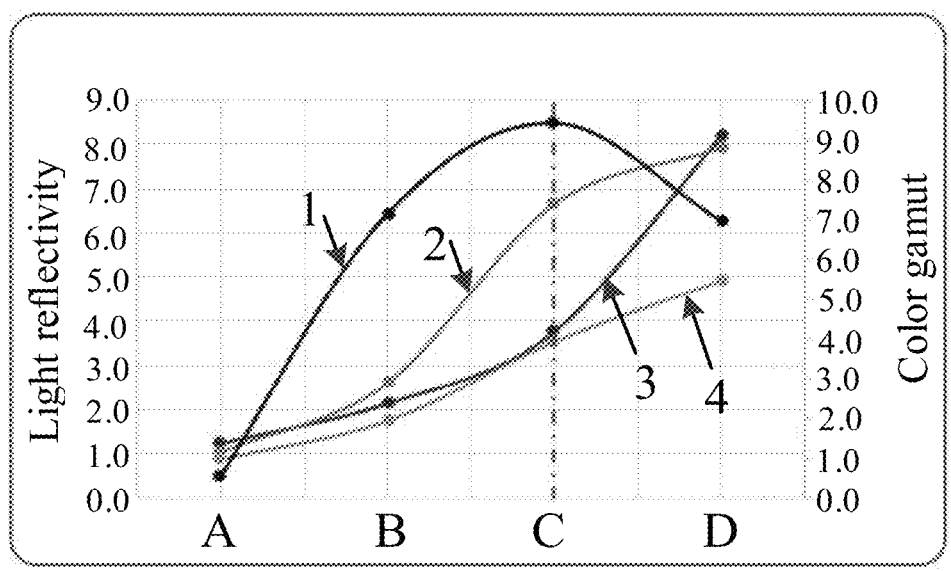

FIG. 13

| A liquid crystal display panel is provided, the liquid crystal display panel includes a first substrate, a second substrate, and a first liquid crystal layer, the first substrate is disposed opposite to the second substrate, the first liquid crystal layer is located between the first substrate and the second substrate, the first liquid crystal layer includes a cholesteric liquid crystal, and the cholesteric liquid crystal is configured to have a conical helix texture when an electric field is applied, to reflect light matched with a helical pitch of the conical helix texture | ⟵ S1 |

| A light scattering layer is formed on a side of the liquid crystal display panel, and the light scattering layer is configured to be able to scatter light reflected by the liquid crystal display panel | ⟵ S2 |

FIG. 14

DISPLAY MODULE AND PREPARATION METHOD THEREFOR, AND DISPLAY APPARATUS

CROSS-REFERENCE TO RELATED APPLICATION

The present application is a U.S. National Phase Entry of International Application No. PCT/CN2022/132192 having an international filing date of Nov. 16, 2022. The entire contents of the above-identified application are hereby incorporated by reference.

TECHNICAL FIELD

The present disclosure relates to the field of display technologies, and particularly, to a display module and a preparation method therefor, and a display apparatus.

BACKGROUND

A Liquid Crystal Display (LCD) is widely used in electronic products such as monitors, smart phones and televisions due to its advantages of low power consumption, light weight, and thin thickness. With the advent of the Internet era, electronic products have fully penetrated into people's daily life, and resulting vision problems have become increasingly prominent. Scientific research shows that the above-mentioned electronic products will emit high-energy blue light, which may directly penetrate lens to reach retinas, damage the retinas and macular regions, lead to visual fatigue, and cause irreversible damage to human eyes. Therefore, it is urgent to develop a display apparatus with an eye protection function, which may meet needs of display and video playback.

SUMMARY

Embodiments of the present disclosure provide a display module and a preparation method therefor, and a display apparatus.

In a first aspect, an embodiment of the present disclosure provides a liquid crystal display panel of a display module, including: a first substrate, a second substrate, and a first liquid crystal layer, the first substrate is disposed opposite to the second substrate, the first liquid crystal layer is located between the first substrate and the second substrate, the first liquid crystal layer includes a cholesteric liquid crystal, and the cholesteric liquid crystal is configured to have a conical helix texture when an electric field is applied, to reflect light matched with a helical pitch of the conical helix texture; and the light scattering layer, which is located on a side of the liquid crystal display panel and is configured to be able to scatter light reflected by the liquid crystal display panel.

In some embodiments, the light scattering layer includes a first scattering layer; and the first scattering layer includes: a third substrate, a fourth substrate, and a second liquid crystal layer, the third substrate is disposed opposite to the fourth substrate, the second liquid crystal layer is located between the third substrate and the fourth substrate, the second liquid crystal layer includes a polymer dispersed liquid crystal, and the polymer dispersed liquid crystal is configured to switch between a scattering state and a transmission state in response to control of an electric field.

In some embodiments, the light scattering layer includes a second scattering layer, the second scattering layer includes a matrix and scattering particles, and the scattering particles are dispersed in the matrix.

In some embodiments, the light scattering layer includes a third scattering layer; and the third scattering layer is divided into a first light adjusting region and a second light adjusting region located in a same plane, and the third scattering layer comprises a fifth substrate, a sixth substrate, and a light adjusting function layer, the fifth substrate is disposed opposite to the sixth substrate, the light adjusting function layer is located between the fifth substrate and the sixth substrate, and the light adjusting function layer includes a polymer dispersed liquid crystal located in the first light adjusting region, and a matrix and scattering particles located in the second light adjusting region, wherein the scattering particles are dispersed in the matrix.

In some embodiments, the liquid crystal display panel is divided into a plurality of pixel regions, a pixel region includes a plurality of sub-pixel regions, the first substrate includes a plurality of pixel electrodes corresponding to the sub-pixel regions one by one, and a pixel electrode is located in a corresponding sub-pixel region; and for any one of the sub-pixel regions, an orthographic projection of one portion of the sub-pixel region on the third scattering layer is located in the first light adjusting region, and an orthographic projection of the other portion of the sub-pixel region on the third scattering layer is located in the second light adjusting region.

In some embodiments, the plurality of the pixel regions in the liquid crystal display panel are arranged in an array along a first direction and a second direction; for any one of the sub-pixel regions, a portion, which is located in the first light adjusting region, of an orthographic projection of the sub-pixel region on the third scattering layer is a first portion, and a portion, which is located in the second light adjusting region, of the orthographic projection of the sub-pixel region on the third scattering layer is a second portion; the first portion and the second portion are arranged along the first direction; or, the first portion and the second portion are arranged along the second direction; or, the first portion and the second portion are arranged along a third direction, wherein the third direction intersects with both the first direction and the second direction.

In some embodiments, for any one of the sub-pixel regions, a portion, which is located in the first light adjusting region, of an orthographic projection of the sub-pixel region on the third scattering layer has an area of a first orthographic projection, and a portion, which is located in the second light adjusting region, of the orthographic projection of the sub-pixel region on the third scattering layer has an area of a second orthographic projection; and a ratio of the area of the first orthographic projection to the area of the second orthographic projection is 0.8 to 1.2.

In some embodiments, the fifth substrate includes a planar fifth electrode and the sixth substrate includes a planar sixth electrode.

In some embodiments, a diameter of the scattering particles is 3 μm to 10 μm.

In some embodiments, a material of the scattering particles includes silicon dioxide.

In some embodiments, a concentration of the scattering particles in the matrix is 3% to 15%.

In a second aspect, an embodiment of the present disclosure provides a preparation method of a display module, and the preparation method includes: providing a liquid crystal display panel, wherein the liquid crystal display panel includes a first substrate, a second substrate, and a first liquid crystal layer, the first substrate is disposed opposite to the second substrate, the first liquid crystal layer is located between the first substrate and the second substrate, the first liquid crystal layer includes a cholesteric liquid crystal, and the cholesteric liquid crystal is configured to have a conical helix texture when an electric field is applied, to reflect light matched with a helical pitch of the conical helix texture; and forming a light scattering layer on a side of the liquid crystal display panel, wherein the light scattering layer is configured to be able to scatter light reflected by the liquid crystal display panel.

In some embodiments, the act of forming the light scattering layer includes: forming a third substrate; forming a second liquid crystal layer on the third substrate, wherein the second liquid crystal layer includes a polymer dispersed liquid crystal, and the polymer dispersed liquid crystal is configured to switch between a scattering state and a transmission state in response to control of an electric field; and forming a fourth substrate on the second liquid crystal layer.

In some embodiments, the act of forming the light scattering layer includes: forming a second scattering layer, wherein the second scattering layer includes a matrix and scattering particles, and the scattering particles are dispersed in the matrix.

In some embodiments, the act of forming the light scattering layer includes: forming a fifth substrate; forming a light adjusting function layer on the fifth substrate, wherein the act of forming the light adjusting function layer includes: forming a polymer dispersed liquid crystal in a first light adjusting region, and forming a matrix and scattering particles in a second light adjusting region, wherein the scattering particles are dispersed in the matrix; and forming a sixth substrate on the light adjusting function layer.

In a third aspect, an embodiment of the present disclosure provides a display apparatus, including the display module described in the first aspect.

BRIEF DESCRIPTION OF DRAWINGS

Accompanying drawings are provided to provide a further understanding of the present disclosure, constitute a part of the specification, and together with the following detailed implementation modes, are used for explaining the present disclosure, but do not constitute limitations on the present disclosure.

FIG. 13 is an optical performance diagram of a display module provided by an embodiment of the present disclosure.

FIG. 14 is a schematic flowchart of a preparation method of a display module provided by an embodiment of the present disclosure.

Figure 1:
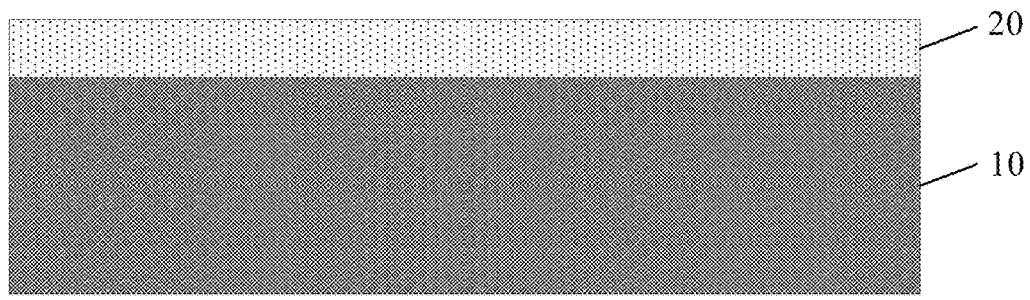
FIG. 1 is a schematic diagram of a structure of a display module provided by an embodiment of the present disclosure.

Reference signs in the drawing are described as follows.
Liquid crystal display panel 10, light scattering layer 20;
  first substrate 1, second substrate 2, and first liquid crystal layer 3.
First base substrate 11, drive function layer 12, pixel electrode 13, and first alignment in layer 14.
Second base substrate 21, common electrode 22, second alignment layer 23, support post 24, and protective layer 25.
Polymer dispersed liquid crystal 2a, scattering particles 2b, and matrix 2c.
First scattering layer 4: third substrate 41, fourth substrate 42, and second liquid crystal layer 43.
Second scattering layer 5.
Third scattering layer 6: fifth substrate 61, sixth substrate 62, and light adjusting function layer 63.
First light adjusting region 6a, second light adjusting region 6b, pixel region 7, sub-pixel region 7r/7g/7b.
First direction X, second direction Y, and third direction Z.

DETAILED DESCRIPTION

Specific implementation modes of the present disclosure are described in detail below with reference to the accompanying drawings. It should be understood that the specific implementation modes described herein are only intended to illustrate and explain the present disclosure and are not intended to limit the present disclosure.

In order to make objectives, technical solutions, and advantages of the embodiments of the present disclosure more clear, the technical solutions of the embodiments of the present disclosure will be clearly and completely described below with reference to the drawings of the embodiments of the present disclosure. Apparently, the described embodiments are a part of the embodiments of the present disclosure, not all of the embodiments. Based on the described embodiments of the present disclosure, all other embodiments obtained by those of ordinary skill in the art without inventive effort are within the protection scope of the present disclosure.

Unless otherwise defined, technical terms or scientific terms used in the embodiments shall have common meanings understood by people with ordinary skills in the field to which the present disclosure pertains. "First", "second", and a similar term used in the present disclosure do not indicate any order, quantity, or importance, but are only used for distinguishing different components. Similarly, "include", "contain", or a similar word means that an element or object appearing before the word covers an element or object listed after the word and its equivalents, but do not exclude another element or object. "Connection", "mutual connection", or a similar term is not limited to a physical or mechanical connection, but may include an electrical connection, whether direct or indirect. "Upper", "lower", "left", "right", and the like, are only used for representing relative positional relationships, and when an absolute position of a described object is changed, the relative positional relationships may also be correspondingly changed.

A Liquid Crystal Display (LCD) is widely used in electronic products such as monitors, smart phones, televisions, and so on due to its advantages of low power consumption, light weight, and thin thickness. With the advent of the Internet era, electronic products have fully penetrated into people's daily life, and resulting vision problems have become increasingly prominent. Scientific research shows that the above-mentioned electronic products will emit high-energy blue light, which may directly penetrate a lens to reach retinas, damage the retinas and macular regions, lead to visual fatigue, and cause irreversible damage to human eyes. Therefore, it is urgent to develop a display apparatus with an eye protection function, which may meet needs of display and video playback.

Since an LCD is a non-emissive display apparatus, a light source needs to be provided. In the related art, a light emitting diode, an external fluorescent lamp, or the like may be used as a backlight source of the LCD, or ambient light may be used as a light source to form a reflection-type display apparatus. When an external luminous apparatus is used as a backlight source, a blue light damage may be reduced by reducing a blue light component or lowering flicker, which can only reduce damage to human eyes to a certain extent but the damage cannot be completely eliminated. When the ambient light is used as an LCD light source, although damage of blue light to human eyes may be completely avoided, in order to meet color display requirements of a display apparatus, a color film and a polarizer are needed to achieve it, which leads to problems of a low reflectivity, high power consumption, and a high cost in a reflection-type LCD, and the reflection-type display apparatus also have defects of a low picture contrast ratio and a poor display effect when the ambient light is sufficient.

Based on this, in the related art, an electronically controlled color cholesteric total reflection liquid crystal display apparatus is provided based on ambient light display, the display apparatus may achieve advantages of high color gamut, a high reflectivity, video display, and the like without color film or polarizer, and has great application prospects. An electronically controlled color cholesteric liquid crystal may have a special conical helix structure, and its reflection of light may be regarded as specular reflection. However, in practical applications, it is found that ambient light incident to the electronically controlled color cholesteric total reflection liquid crystal display apparatus may be regarded as parallel light or light with a small divergence angle; taking parallel light as an example, the parallel light will be incident to the electronically controlled color cholesteric total reflection liquid crystal display apparatus at a certain incident angle, wherein part of the light will be specularly reflected inside the electronically controlled color cholesteric total reflection liquid crystal display apparatus and emitted at a certain reflection angle (the reflection angle is equal to the incident angle). At this time, a user can only receive reflected light from a specific angle, that is, the user can only observe a picture presented by the display apparatus from a specific angle, and a range of a viewing angle of the display apparatus is relatively small, which affects display performance of the display apparatus adversely.

Figure 2:
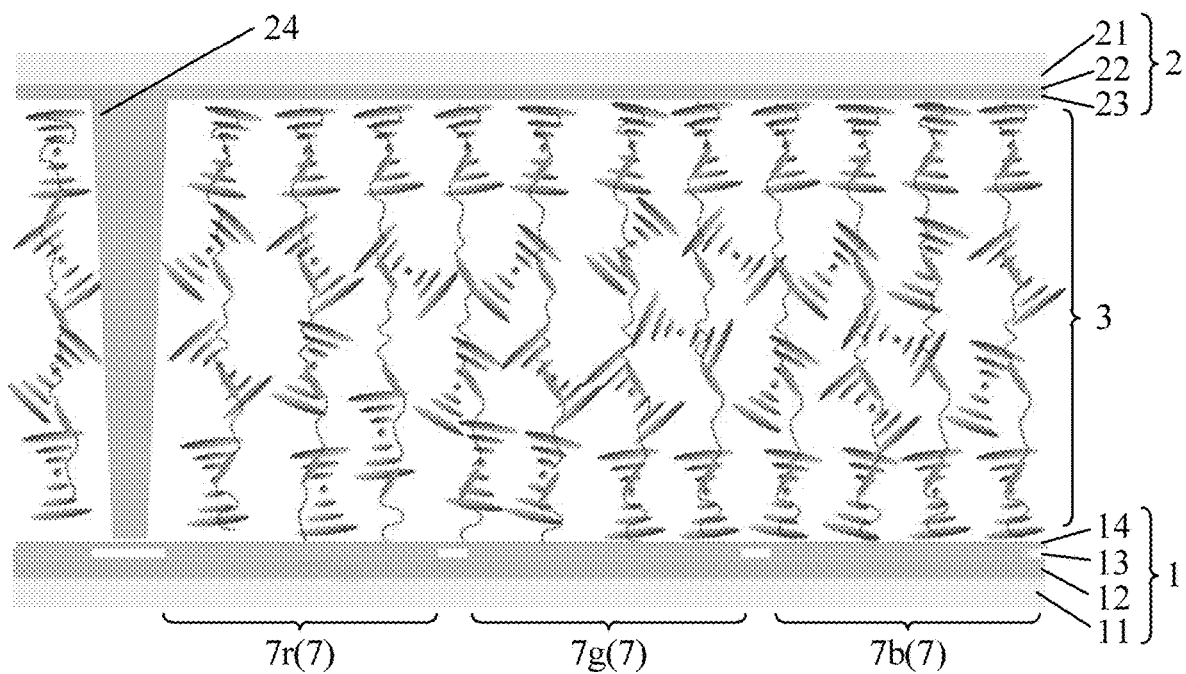
FIG. 2 is a schematic diagram of a structure of a liquid crystal display panel in FIG. 1.

In order to solve at least one of technical problems existing in the related art, an embodiment of the present disclosure provides a display module. FIG. 1 is a schematic diagram of a structure of a display module provided by an embodiment of the present disclosure, and FIG. 2 is a schematic diagram of a structure of a liquid crystal display panel in FIG. 1. As shown in FIG. 1 and FIG. 2, the display module includes a liquid crystal display panel 10 and a light scattering layer 20. Among them, the liquid crystal display panel 10 includes a first substrate 1, a second substrate 2, and a first liquid crystal layer 3, wherein the first substrate 1 is disposed opposite to the second substrate 2, the first liquid crystal layer 3 is located between the first substrate 1 and the second substrate 2, and the first liquid crystal layer 3 includes a cholesteric liquid crystal configured to have a conical helix texture when an electric field is applied, to reflect light matched with a helical pitch of the conical helix texture. The light scattering layer 20 is located on a side of the liquid crystal display panel 10 and is configured to be able to scatter light reflected by the liquid crystal display panel 10.

In the display module provided by the embodiment of the present disclosure, the liquid crystal display panel 10 is an electronically controlled color cholesteric total reflection liquid crystal display panel, which uses ambient light as a light source, and by adjusting a helical pitch of a cholesteric liquid crystal, it may be achieved that a color of light reflected by the cholesteric liquid crystal is controlled to reflect visible light with different colors under an action of different electric fields, so as to achieve color display and avoid damage of blue light to human eyes. In addition, no color film or polarizer is needed in the liquid crystal display panel, which reduces a manufacturing cost of the display module while achieving color display with high color gamut; the light scattering layer 20 is configured to scatter light reflected by the liquid crystal display panel 10 to enlarge an exit angle range of light reflected by the display module, so that a viewing angle of the display module is increased, which improves a display effect of the display module.

It should be understood that a cholesteric liquid crystal has selective specular reflectance properties when it has a conical helix texture, and when a helical pitch of the cholesteric liquid crystal is constant, it will reflect light in a specific wavelength band corresponding to the helical pitch, thus exhibiting a corresponding color. Therefore, when the cholesteric liquid crystal has a conical helix texture, a helical pitch of the cholesteric liquid crystal may be controlled through an electric field, so as to control a wavelength (color) of reflected light.

As an example, the liquid crystal display panel 10 is divided into a plurality of pixel regions 7, and the pixel region 7 includes a plurality of sub-pixel regions, which are respectively a sub-pixel region 7r for emitting red light, a sub-pixel region 7g for emitting green light, and a sub-pixel region 7b for emitting blue light. The first substrate 1 further includes a plurality of pixel electrodes 13 corresponding to the sub-pixel regions one by one, the pixel electrodes 13 are located within corresponding sub-pixel regions, and the second substrate 2 includes a planar common electrode 22. As shown in FIG. 2, when an electric field is not formed between a pixel electrode 13 and a common electrode 22, the cholesteric liquid crystal has a focal cone texture and scatters incident light; as shown in FIG. 3 and FIG. 4, when different voltages are loaded between the pixel electrode 13 and the common electrode 22 to form an electric field, the cholesteric liquid crystal located in the electric field changes from the focal cone texture to a conical helix texture, so that incident visible light matching with its helical pitch may be reflected, and visible light with different colors may be reflected under an action of different electric fields, thus achieving color display.

Figure 3:
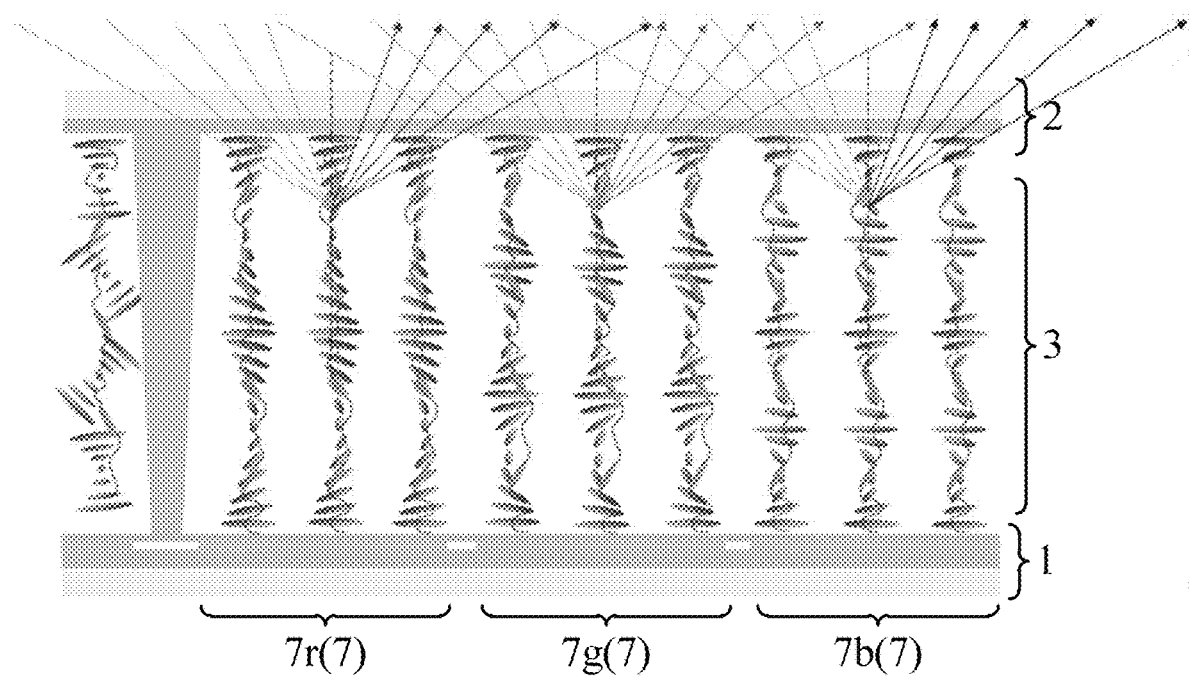
FIG. 3 is a schematic diagram of the liquid crystal display panel shown in FIG. 2 when reflecting non-parallel light.
Figure 4:
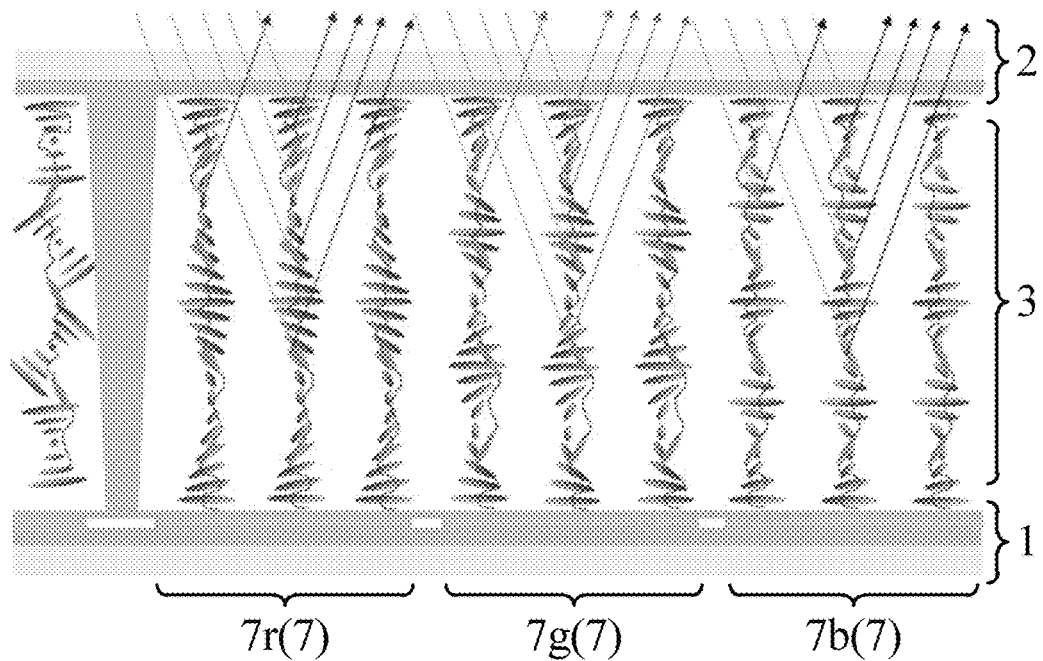
FIG. 4 is a schematic diagram of the liquid crystal display panel shown in FIG. 2 when reflecting parallel light.

As shown in FIG. 2 to FIG. 4, the first substrate 1 further includes a first alignment layer 14, a first base substrate 11, and a drive function layer 12, wherein the first alignment layer 14 is located between the pixel electrode 13 and the first liquid crystal layer 3, the first base substrate 11 is located on a side of the pixel electrode 13 away from the first alignment layer 14, the drive function layer 12 is located between the first base substrate 11 and the pixel electrode 13, the drive function layer 12 includes a plurality of drive circuits (not shown) corresponding to the pixel electrodes 13 one by one, and a drive circuit is connected with a corresponding pixel electrode 13 and is configured to provide a pixel voltage to the corresponding pixel electrode 13. The second substrate 2 further includes a second base substrate 21 and a second alignment layer 23, wherein the second alignment layer 23 is located between the common electrode 22 and the first liquid crystal layer 3, and the second base substrate 21 is located on a side of the common electrode 22 away from the second alignment layer 23.

A vertical alignment or a parallel alignment may be adopted for the first alignment layer 14 and the second alignment layer 23 mentioned above; the first base substrate 11 and the second base substrate 21 may be independently selected as a hard base substrate or a flexible base substrate, respectively, wherein the hard base substrate may be a glass base substrate and the flexible base substrate may be a resin base substrate, neither of which is limited in the embodiment of the present disclosure.

In one example, as shown in FIG. 2 to FIG. 4, the liquid crystal display panel 10 further includes a support post 24 located between the first substrate 1 and the second substrate 2.

Figure 5:
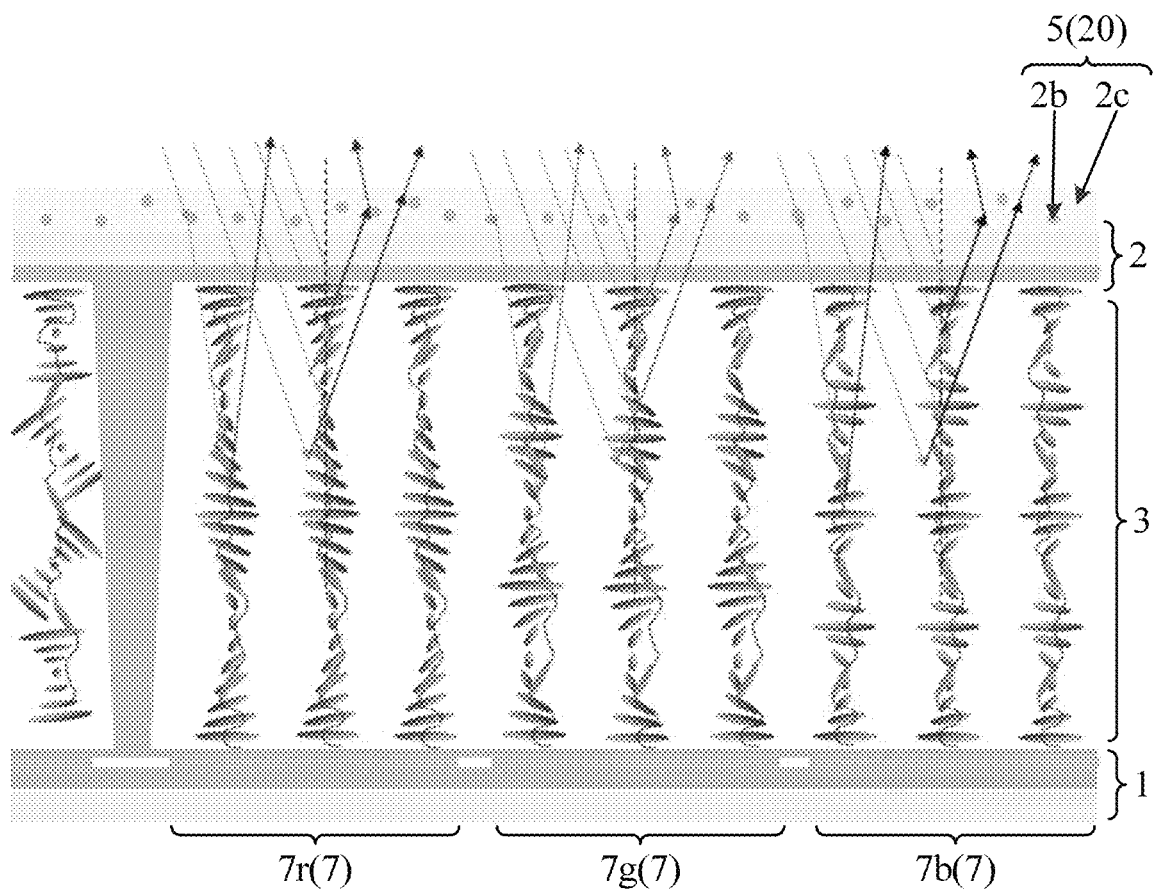
FIG. 5 is a schematic diagram of an optical path of a display module provided by an embodiment of the present disclosure under an action of a second scattering layer.

FIG. 5 is a schematic diagram of a structure of another display module provided by an embodiment of the present disclosure. As shown in FIG. 5, in some embodiments, the light scattering layer 20 includes a second scattering layer 5, the second scattering layer 5 includes a matrix 2c and scattering particles 2b, and the scattering particles 2b are dispersed in the matrix 2c. By disposing the second scattering layer 5, light reflected by the liquid crystal display panel may be scattered.

When ambient light is incident on the second scattering layer 5, the scattering particles 2b in the second scattering layer 5 may scatter the ambient light, so that an incident angle range of incident light incident on the liquid crystal display panel 10 is enlarged. The liquid crystal display panel 10 selectively reflects the incident light to form reflected light, and the reflected light also has a relatively large exit angle range. The reflected light passes through the second scattering layer 5 again, and the scattering particles 2b in the second scattering layer 5 may scatter the reflected light, so that the exit angle range of the reflected light is further enlarged, which enables a light intensity of the reflected light at each exit angle to tend to be consistent. It may be seen that the display module provided by the present disclosure has a relatively large range of a viewing angle, and brightness at each viewing angle is relatively uniform, which is beneficial to improving a display effect of the display apparatus.

In one example, a material of the scattering particles 2b may include silicon dioxide.

It should be understood that a concentration of the scattering particles 2b in the second scattering layer 5 in the matrix 2c will affect a scattering effect of the second scattering layer 5 on light adversely, and in addition, a size of the scattering particles 2b will also affect the scattering effect adversely. Only by setting the scattering particles 2b with an appropriate size and concentration, can the second scattering layer 5 achieve better optical performance. A diameter/concentration of the scattering particle 2b is too small, the scattering effect is not good, a reflectivity of a front viewing angle is relatively low, color gamut is relatively low, and color purity is not high; a diameter of scattering particles 2b is too large, a light outlet of a pixel unit will be blocked, and a concentration/diameter of the scattering particles 2b is too large, a haze of the emitting light will be increased, and color purity will be affected adversely. Preferably, the diameter of the scattering particles 2b is from 3 μm to 10 μm, for example, from 4 μm to 5 μm. Preferably, the concentration of the scattering particles 2b in the second scattering layer 5 is from 3% to 15%, for example, from 5% to 10%.

In addition, in one example, the material of the matrix 2c in the second scattering layer 5 may be an adhesive material, for example, an optical adhesive, in a preparation process, the scattering particles 2b may first be uniformly doped in the matrix 2c, and the second scattering layer 5 is adhered to the liquid crystal display panel 10 with curing of the matrix 2c; in another example, a material of the matrix 2c may also be a polymer material without an adhesive effect, in a preparation process, the scattering particles 2b may first be uniformly doped in the matrix 2c and be cured to form a scattering layer thin film, that is, the second scattering layer 5, and then the second scattering layer 5 is adhered to the liquid crystal display panel 10 by coating an adhesive material, in this case, the adhesive material may be an optical adhesive; and in any of the above examples, a refractive index range of the optical adhesive may be from 1 to 2.5, and the material of the matrix 2c in the second scattering layer 5 is not limited in the embodiment of the present disclosure.

It should be noted that the concentration of the scattering particles 2b described above is referred to as a mass percentage of the scattering particles 2b in the second scattering layer 5.

Figure 6:
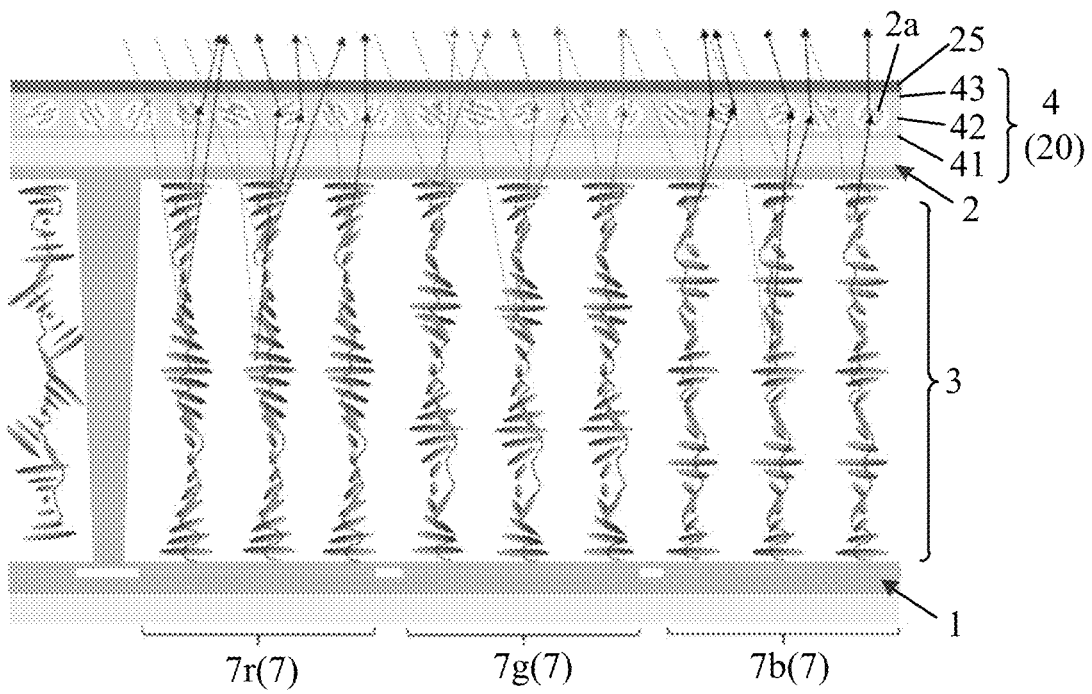
FIG. 6 is a schematic diagram of an optical path of a display module provided by an embodiment of the present disclosure when no electric field is applied to a first scattering layer.
Figure 7:
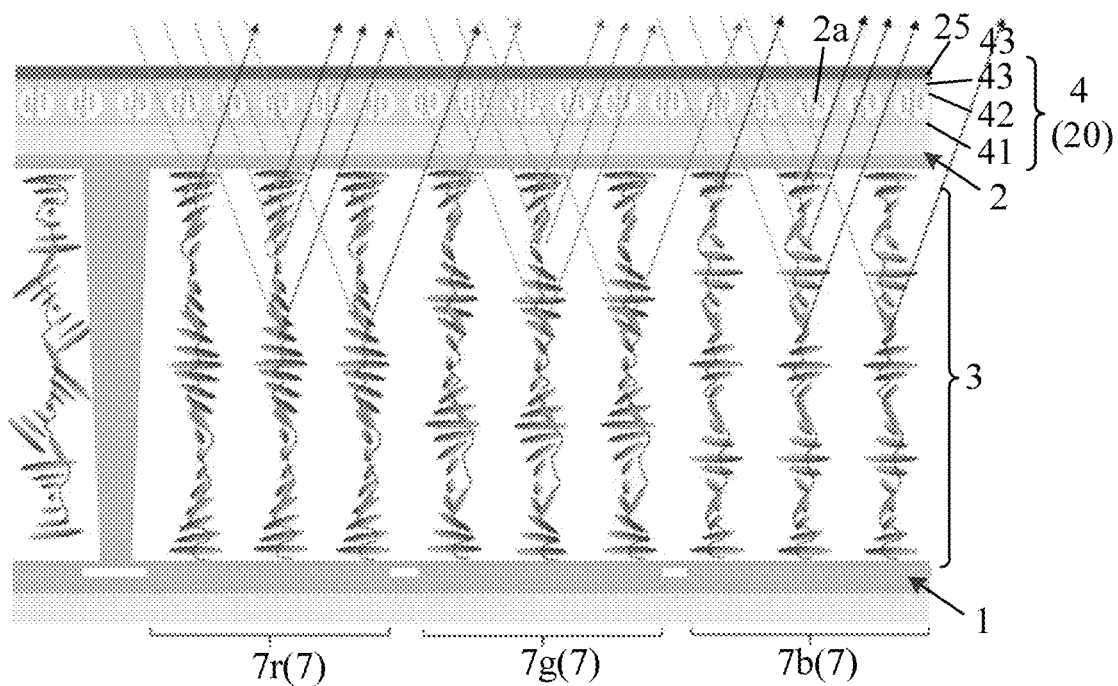
FIG. 7 is a schematic diagram of an optical path of a display module provided by an embodiment of the present disclosure when an electric field is applied to a first scattering layer.

FIG. 6 is a schematic diagram of an optical path of a display module provided by an embodiment of the present disclosure when no electric field is applied to a first scattering layer, and FIG. 7 is a schematic diagram of an optical path of a display module provided by an embodiment of the present disclosure when an electric field is applied to a first scattering layer. In some embodiments, as shown in FIG. 6 and FIG. 7, the light scattering layer 20 includes a first scattering layer 4; the first scattering layer 4 includes a third substrate 41, a fourth substrate 42, and a second liquid crystal layer 43, the third substrate 41 is disposed opposite to the fourth substrate 42, the second liquid crystal layer 43 is located between the third substrate 41 and the fourth substrate 42, and the second liquid crystal layer 43 includes a polymer dispersed liquid crystal 2a which is configured to switch between a scattering state and a transmission state in response to electric field control.

Optionally, as shown in FIG. 6 and FIG. 7, the display module further includes a protective layer 25 located on a side of the first scattering layer 4 away from the liquid crystal display panel 10, and the protective layer 25 is configured to protect other film layers in the display module from water and oxygen erosion, thus ensuring a display effect of the display module.

In one example, as shown in FIG. 6 and FIG. 7, the third substrate 41 includes a planar third electrode, and the fourth substrate 42 includes a planar fourth electrode, the third electrode and fourth electrode are configured to apply an electric field to the polymer dispersed liquid crystal 2*a* to control deflection directions of its liquid crystal molecules, thereby switching between the scattering state and the transmission state.

It should be noted that the third substrate 41 and the fourth substrate 42 may be independently selected as a hard base substrate or a flexible base substrate, wherein the hard base substrate may be a glass substrate and the flexible base substrate may be a resin substrate; and the electric field for controlling deflection of liquid crystal molecules in the polymer dispersed liquid crystal 2*a* may also be achieved by externally applying a voltage, which is not limited in the embodiments of the present disclosure.

In an embodiment of the present disclosure, the polymer dispersed liquid crystal 2*a* includes liquid crystal molecules and a polymer; as shown in FIG. 6, when no electric field is applied to the first scattering layer 4, an effective refractive index of the liquid crystal molecules in the first liquid crystal layer 3 is different from a refractive index of a polymer in the first liquid crystal layer 3, and at this time, the polymer dispersed liquid crystal 2*a* is in a scattering state as a whole. When ambient light is incident on the first scattering layer 4, the first liquid crystal layer 3 in the first scattering layer 4 may scatter the ambient light, so that an incident angle range of an incident light incident on the liquid crystal display panel 10 is enlarged. The liquid crystal display panel 10 selectively reflects the incident light to form reflected light, and the reflected light also has a relatively large exit angle range. The reflected light passes through the first scattering layer 4 again, and the first liquid crystal layer 3 in the first scattering layer 4 may scatter the reflected light, so that the exit angle range of the reflected light is further enlarged, which enables a light intensity of the reflected light at each exit angle to tend to be consistent.

As shown in FIG. 7, when an electric field is applied to the first scattering layer 4, the effective refractive index of the liquid crystal molecules in the first liquid crystal layer 3 changes, and the effective refractive index of the liquid crystal molecules in the first liquid crystal layer 3 is the same or substantially the same as the refractive index of the polymer in the first liquid crystal layer 3. At this time, the polymer dispersed liquid crystal 2*a* is in a transmission state as a whole, and both angles of an incident light and reflected light passing through the first scattering layer 4 do not change. At this time, as shown in FIG. 2, e reflected light formed by the liquid crystal display panel 10 has a relatively small light exit angle range, and a user can only receive the reflected light from a specific angle, that is, the user can only observe a picture presented by the display apparatus from a specific angle, thus achieving an effect of protecting privacy of the user.

Figure 8:
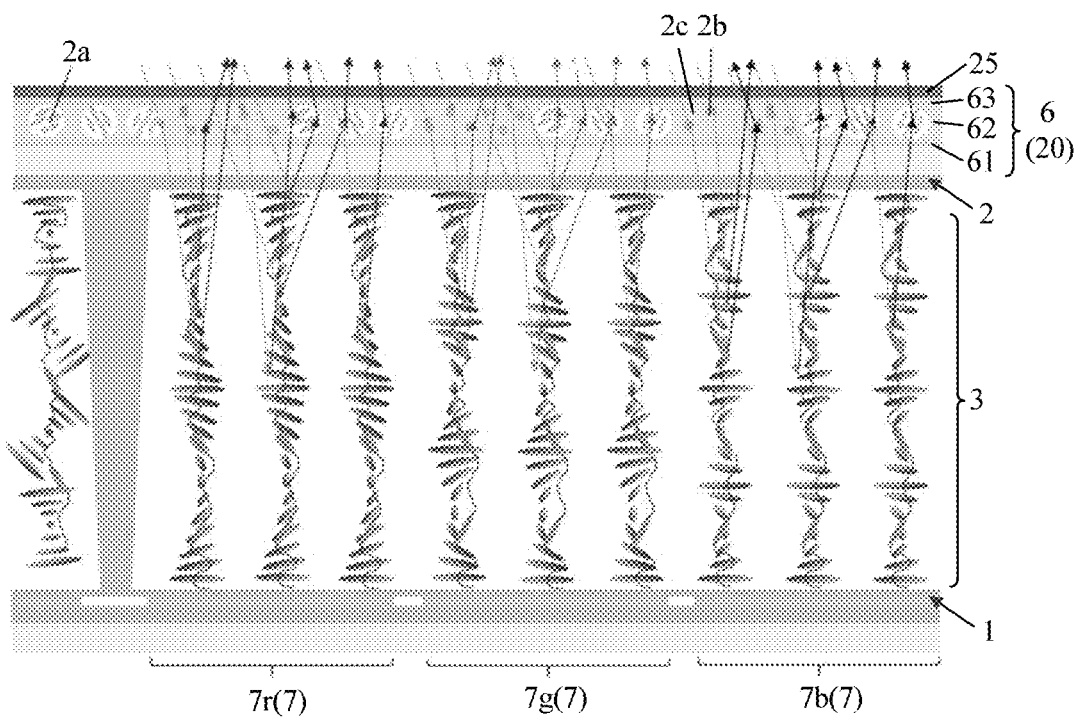
FIG. 8 is a schematic diagram of an optical path of a display module provided by an embodiment of the present disclosure when no electric field is applied to a third scattering layer.
Figure 9:
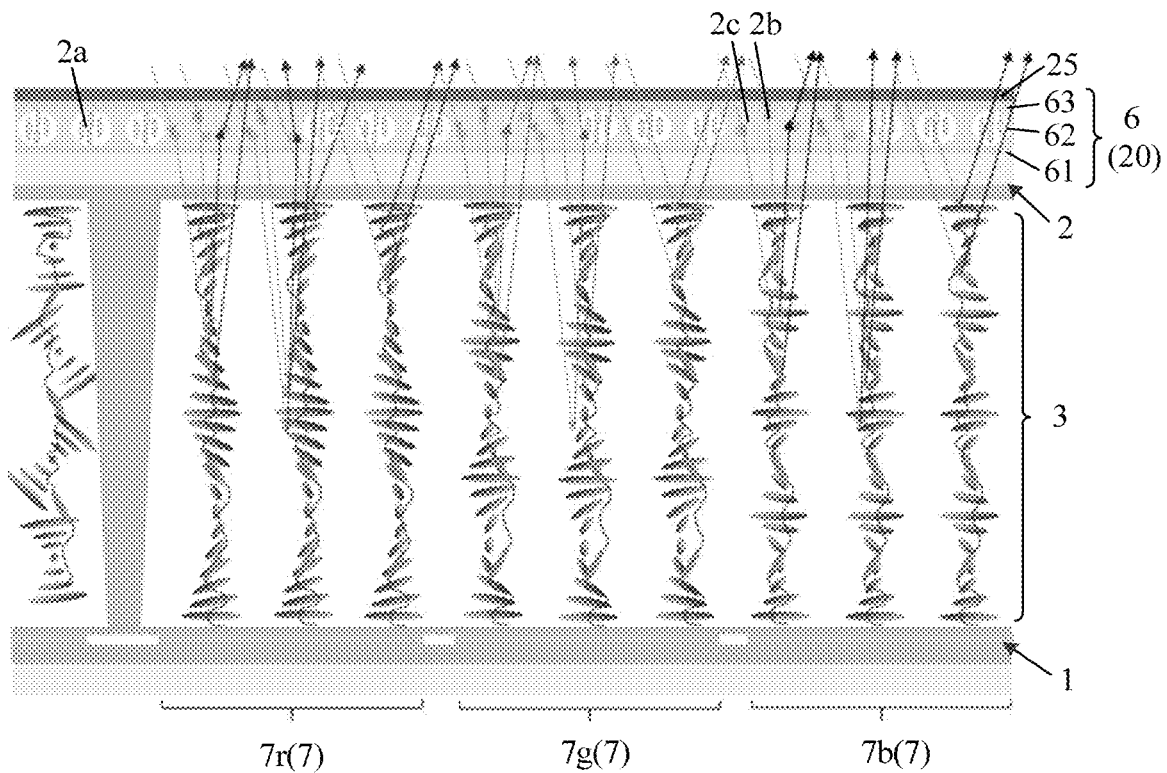
FIG. 9 is a schematic diagram of an optical path of a display module provided by an embodiment of the present disclosure when an electric field is applied to a third scattering layer.

FIG. 8 is a schematic diagram of an optical path of a display module provided by an embodiment of the present disclosure when no electric field is applied to a third scattering layer, and FIG. 9 is a schematic diagram of an optical path of a display module provided by an embodiment of the present disclosure when an electric field is applied to a third scattering layer. In some embodiments, as shown in FIG. 8 and FIG. 9, the light scattering layer 20 includes a third scattering layer 6, the third scattering layer 6 is divided into a first light adjusting region 6*a* and a second light adjusting region 6*b* located in a same plane; the third scattering layer 6 includes a fifth substrate 61, a sixth substrate 62, and a light adjusting function layer 63, the fifth substrate 61 is disposed opposite to the sixth substrate 62, the light adjusting function layer 63 is located between the fifth substrate 61 and the sixth substrate 62, and the light adjusting function layer 63 includes a polymer dispersed liquid crystal 2*a* located in the first light adjusting region 6*a*, and a matrix 2*c* and scattering particles 2*b* located in the second light adjusting region 6*b*, and the scattering particles 2*b* are dispersed in the matrix 2*c*.

Optionally, as shown in FIG. 8 and FIG. 9, the display module further includes a protective layer 25 located on a side of the third scattering layer 6 away from the liquid crystal display panel 10, and the protective layer 25 is configured to protect other film layers in the display module from water and oxygen erosion, thus ensuring a display effect of the display module.

It should be understood that a concentration and a size of the scattering particles 2*b* located in the second light adjusting region 6*b* are consistent with those in the above embodiments, and will not be repeated here; in addition, the scattering particles 2*b* and the matrix 2*c* in the second light adjusting region 6*b* form a scattering thin film after they are cured, and the concentration of the scattering particles 2*b* refers to a mass percentage thereof in the scattering thin film.

In one example, based on a same inventive concept as the third substrate 41 and the fourth substrate 42, the fifth substrate 61 and the sixth substrate 62 may be independently selected as a hard base substrate or a flexible base substrate to fix the polymer dispersed liquid crystal 2*a* in the light adjusting function layer 63 between them; it may also be that planar electrodes are respectively disposed in the fifth substrate 61 and the sixth substrate 62 to apply a voltage to the polymer dispersed liquid crystal 2*a* to control a deflection direction of the liquid crystal molecules thereof.

It should be noted that an electric field for controlling deflection of the liquid crystal molecules in the polymer dispersed liquid crystal 2*a* may also be achieved by externally applying a voltage, which is not limited in the embodiments of the present disclosure.

In an embodiment of the present disclosure, the polymer dispersed liquid crystal 2*a* includes liquid crystal molecules and a polymer; as shown in FIG. 8, when no electric field is applied to the third scattering layer 6, for the first light adjusting region 6*a*, an effective refractive index of the liquid crystal molecules in the polymer dispersed liquid crystal 2*a* is different from a refractive index of the polymer, and at this time, the polymer dispersed liquid crystal 2*a* is in a scattering state as a whole. When ambient light is incident on the first light adjusting region 6*a* of the third scattering layer 6, the polymer dispersed liquid crystal 2*a* may scatter the ambient light, so that an incident angle range of the incident light incident on the liquid crystal display panel 10 is enlarged, and the liquid crystal display panel 10 selectively reflects the incident light to form reflected light, and the reflected light also has a relatively large exit angle range; and when the reflected light passes through the first light adjusting region 6*a*, the polymer dispersed liquid crystal 2*a* may also scatter the reflected light, so that the exit angle range of the reflected light is further enlarged, which enables a light intensity of the reflected light at each exit angle to tend to be consistent.

Meanwhile, for the second light adjusting region 6*b*, the scattering particles 2*b* may scatter the ambient light, so that an incident angle range of incident light incident on the liquid crystal display panel 10 is enlarged. The liquid crystal display panel 10 selectively reflects the incident light to form reflected light, and the reflected light also has a relatively large exit angle range. The reflected light passes through the second light adjusting region 6b again, and the scattering particles 2b in the second light adjusting region 6b may scatter the reflected light, so that the exit angle range of the reflected light is further enlarged, which enables a light intensity of the reflected light at each exit angle to tend to be consistent.

It may be seen that the polymer dispersed liquid crystal 2a and the scattering particles 2b are simultaneously disposed in the third scattering layer 6, so that the display module has a relatively large viewing angle range under a condition of applying an electric field, and brightness at each viewing angle is relatively uniform, which is beneficial to improving a display effect of the display module.

As shown in FIG. 9, when an electric field is applied to the third scattering layer 6, the effective refractive index of the liquid crystal molecules in the polymer dispersed liquid crystal 2a located in the first light adjusting region 6a changes, and the effective refractive index of the liquid crystal molecules in the first light adjusting region 6a is the same as or substantially the same as the refractive index of the polymer in the first light adjusting region 6a; and at this time, the polymer dispersed liquid crystal 2a is in a transmission state as a whole without changing an exit/incident angle of light, and meanwhile the scattering particles 2b located in the second light adjusting region 6b are not affected by change of the electric field and remain in a scattering state to light. Therefore, the third scattering layer 6 to which no electric field is applied may also increase a viewing angle of the display module, which improves a display effect of the display module.

Figure 10:
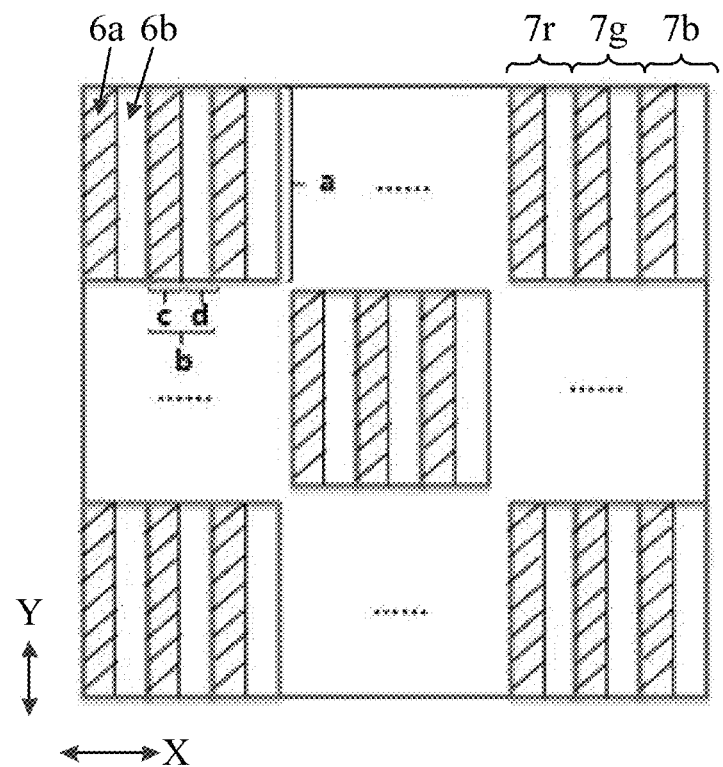
FIG. 10 to FIG. 12 are all schematic diagrams of a planar structure of a display module provided by an embodiment of the present disclosure.
Figure 11:
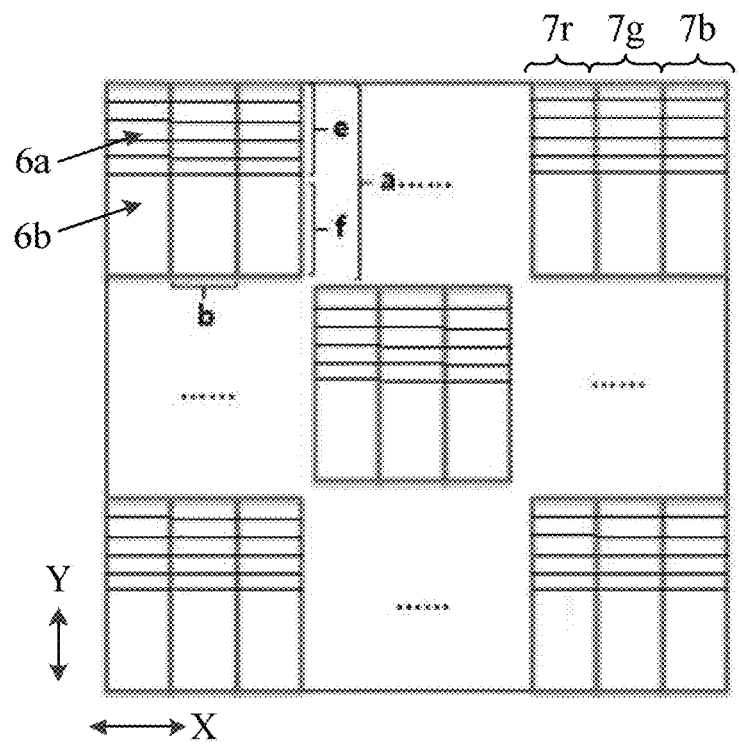
Figure 12:
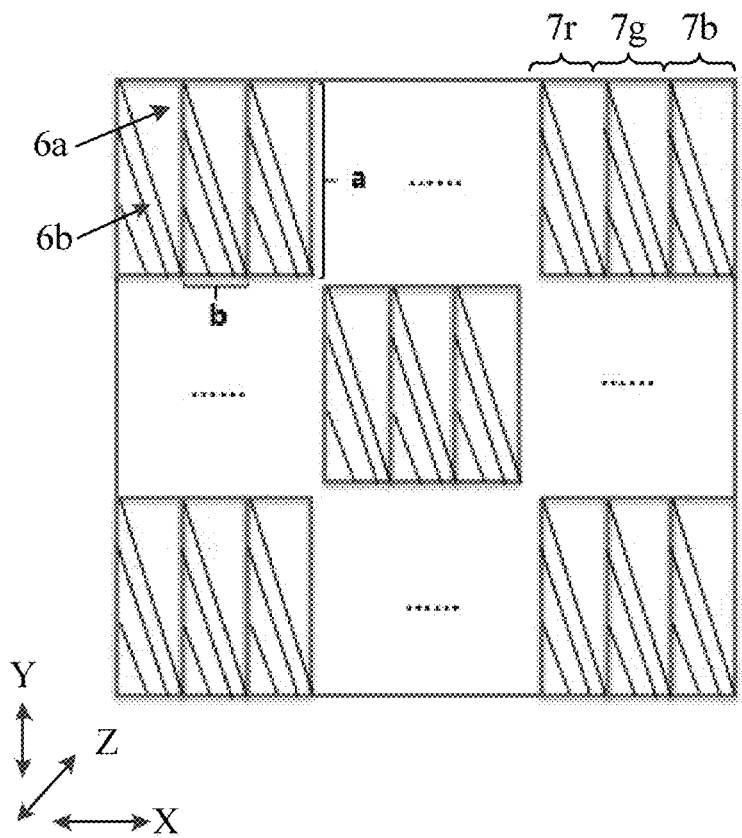

It should be understood that the liquid crystal display panel 10 is divided into a plurality of pixel regions 7 including a plurality of sub-pixel regions, a helical pitch of a cholesteric liquid crystal corresponding to each sub-pixel region is different and a color of reflected light is different, i.e., a light exit color of each sub-pixel is different. In an example, as shown in FIG. 10 to FIG. 12, each pixel region 7 includes three sub-pixel regions with light exit colors of red, green, and blue, respectively. In some embodiments, for any one sub-pixel region, an orthographic projection of one portion of the sub-pixel region on the third scattering layer 6 is located in the first light adjusting region 6a, and an orthographic projection of the other portion of the sub-pixel region on the third scattering layer 6 is located in the second light adjusting region 6b.

It should be noted that a spacing region between adjacent pixel regions may be the first light adjusting region 6a in which the polymer dispersed liquid crystal 2a is disposed, or may be the second light adjusting region 6b in which the scattering particles 2b are disposed, which are not limited in the embodiments of the present disclosure.

FIG. 10 to FIG. 12 are all schematic diagrams of a planar structure of a display module provided by an embodiment of the present disclosure. In some embodiments, a plurality of pixel regions in the liquid crystal display panel 10 are arranged in an array along a first direction X and a second direction Y; and for any one sub-pixel region, a portion, which is located in the first light adjusting region 6a, of an orthographic projection of the sub-pixel region on the third scattering layer 6 is a first portion, and a portion, which is located in the second light adjusting region 6b, of the orthographic projection of the sub-pixel region on the third scattering layer 6 is a second portion.

As shown in FIG. 10 to FIG. 12, each of the pixel regions 7 includes three sub-pixel regions, which are a sub-pixel region 7r for emitting red light, a sub-pixel region 7g for emitting green light, and a sub-pixel region 7b for emitting blue light, respectively, and a shape of each of the sub-pixel regions is a rectangle with a size of a×b.

As shown in FIG. 10, the first portion and the second portion are both rectangular, and both are arranged along the first direction X, i.e. a vertical direction, wherein in each sub-pixel region, a length of the first portion in the first direction is c, and a length of the second portion in the first direction is d, preferably c: d is equal to 1. Or, as shown in FIG. 11, the first portion and the second portion are likewise rectangular, and both are arranged along the second direction Y, i.e. a horizontal direction, wherein in each pixel region, a length of the first portion in the second direction is e, and a length of the second portion in the second direction is f, preferably e: f is equal to 1. Or, as shown in FIG. 12, both the first portion and the second portion are in a shape of a right triangle, and hypotenuses of two right triangles are overlapped, so as to achieve that the first portion and the second portion are arranged along a third direction Z, the third direction Z may be an extension direction of a hypotenuse of the right triangle which intersects with both the first direction X and the second direction Y.

It should also be noted that shapes of the first portion and the second portion are not limited to the above shapes, one of the first portion and the second portion may be annular, and the other may be a region other than an annular region in the sub-pixel region, or the first portion and the second portion may be in other irregular shapes, and specific shapes of the first portion and the second portion are not limited in the embodiments of the present disclosure.

In some embodiments, for any one of the sub-pixel regions, a portion, which is located in the first light adjusting region 6a, of an orthographic projection of the sub-pixel region on the third scattering layer 6 has an area of a first orthographic projection, and a portion, which is located in the second light adjusting region 6b, of the orthographic projection of the sub-pixel region on the third scattering layer 6 has an area of a second orthographic projection; and a ratio of the area of the first orthographic projection to the area of the second orthographic projection is 0.8 to 1.2. Preferably, the ratio of the area of the first orthographic projection to the area of the second orthographic projection is 1:1, that is to say, for any sub-pixel region, after light is reflected by a cholesteric liquid crystal in the first liquid crystal layer 3, one half of the light passes through the second light adjusting region 6b, that is, is scattered through the scattering particles 2b, to increase optical performance of the display module at a non-specular reflection angle of the liquid crystal display panel 10, and the other half passes through the first light adjusting region 6a, that is, is emitted through the polymer dispersed liquid crystal 2a. Under a condition that no electric field is applied to the polymer dispersed liquid crystal 2a, both a region of the scattering particles 2b and a region of the polymer dispersed liquid crystal 2a have refractive and scattering effects on the light, showing a more uniform display effect with a wide viewing angle as a whole; and under a condition that an electric field is applied to the polymer dispersed liquid crystal 2a, the region of the scattering particles 2b refracts the light to enhance optical performance of a non-specular reflection angle to achieve an effect of a wide viewing angle, and the region of the polymer dispersed liquid crystal 2a has no scattering effect on light, which enhances optical performance of a specular reflection angle; and a combination of the two regions achieves an effect of a wide viewing angle with enhanced performance of a specular reflection viewing angle.

It should be noted that materials of all electrodes in the embodiments of the present disclosure are all transparent indium tin oxide materials, so as to avoid an influence on light emission of a pixel unit.

FIG. 13 is an optical performance diagram of a display module provided by an embodiment of the present disclosure, and as shown in FIG. 13, abscissas A, B, C, and D respectively represent a display module without the light scattering layer 20, a display module in which the second scattering layer 5 is regarded as the light scattering layer 20 and a concentration of the scattering particles 2b is a, a display module in which the second scattering layer 5 is regarded as the light scattering layer 20 and the concentration of the scattering particles 2b is b, and a display module in which the second scattering layer 5 is regarded as the light scattering layer 20 and the concentration of the scattering particles 2b is c, wherein a<b<c; and in addition, sizes/materials of corresponding scattering particles in the display modules B, C, and D are identical, both of which have been described in detail in previous embodiments, and will not be repeated here. An ordinate on the left in the figure indicates a reflectivity of light of the display module; and an ordinate on the right in the figure indicates color saturation, that is, color gamut.

As shown in FIG. 13, curve 1 is color gamut of light scattered by different display modules through the light scattering layer 20, and curves 2, 3, and 4 are reflectivity of different display modules for red, green, and blue light, respectively. It may be seen that with increase of the concentration of the scattering particles 2b in the light scattering layer 20, reflectivity of light with different colors is improved, but degrees of improvement are different, and meanwhile, with increase of the concentration of the scattering particles 2b in the light scattering layer 20, color gamut first increases and then decreases. Since a human eye is most sensitive to green light, compared with red light and blue light, the highest color gamut may be reached when reflectivity of green light is the highest, and based on this, a numerical range of the concentration of the scattering particles is finally determined.

Based on a same inventive concept, an embodiment of the present disclosure also provides a preparation method of a display module, which may be used for preparing the display module provided by the aforementioned embodiments, and will be described in detail below. FIG. 14 is a schematic flowchart of a preparation method of a display module provided by an embodiment of the present disclosure.

In some embodiments, as shown in FIG. 14, the preparation method of the display module includes following acts.

In act S1, a liquid crystal display panel 10 is provided, the liquid crystal display panel 10 includes a first substrate 1, a second substrate 2, and a first liquid crystal layer 3, wherein the first substrate 1 is disposed opposite to the second substrate 2, the first liquid crystal layer 3 is located between the first substrate 1 and the second substrate 2, and the first liquid crystal layer 3 includes a cholesteric liquid crystal configured to have a conical helix texture when an electric field is applied, to reflect light matched with a helical pitch of the conical helix texture.

In act S2, a light scattering layer 20 is formed on a side of the liquid crystal display panel 10, and the light scattering layer 20 is configured to scatter light reflected by the liquid crystal display panel 10.

In some embodiments, the act S1 above includes: a first metal layer, an insulation layer, and a second metal layer are sequentially prepared on a first base substrate 11, a drive function layer 12 is formed by patterning the first metal layer, and a layer of a pixel electrode 13 is formed by patterning the second metal layer; a layer of a planar electrode i.e., a common electrode 22 is prepared and formed on the second base substrate 21, and a pattern of a support may be formed through exposure; a first alignment layer 14 is formed on the layer of the pixel electrode 13 to form a first substrate 1, a second alignment layer 23 is formed on the layer of the common electrode 22 to form a second substrate 2, a frame sealing adhesive is coated on the second substrate 2, and a cholesteric liquid crystal is dripped on the first substrate 1; the second substrate 2 coated with the frame sealing adhesive and the first substrate 1 dripped with the cholesteric liquid crystal are vacuum cell-assembled; and a heat treatment is performed on a thermally polymerizable monomer in the frame sealing adhesive to make it polymerized, so as to enhance adhesion of the frame sealing adhesive while making alignment of the cholesteric liquid crystal more uniform to form the liquid crystal display panel 10.

In one embodiment, the above act S2 includes: a third substrate 41 is formed; a second liquid crystal layer 43 is formed on the third substrate 41, wherein the second liquid crystal layer 43 includes a polymer dispersed liquid crystal 2a configured to switch between a scattering state and a transmission state in response to control of an electric field; and a fourth substrate 42 is formed on the second liquid crystal layer 43.

In the above embodiment, the act S2 specifically may include: coating a planar electrode, i.e., the third substrate 41, on a side of the second substrate 2 of the liquid crystal display panel 10, coating a polymer dispersed liquid crystal 2a on the third substrate 41, performing a Ultraviolet (UV) polymerization treatment on the polymer dispersed liquid crystal 2a to form a second liquid crystal layer 43, and adhering a flexible planar electrode, i.e., the fourth substrate 42, on the second liquid crystal layer 43.

In another embodiment, the above act S2 includes: a second scattering layer 5 is formed, wherein the second scattering layer 5 includes a matrix 2c and scattering particles 2b, and the scattering particles 2b are dispersed in the matrix 2c.

Among them, a concentration and a size of the scattering particles 2b in the matrix 2c have been described in detail in previous embodiments, and will not be repeated here.

In still another embodiment, the above act S2 includes: a fifth substrate 61 is formed; a light adjusting function layer 63 is formed on the fifth substrate 61, wherein the act of forming the light adjusting function layer 63 includes: forming a polymer dispersed liquid crystal 2a in the first light adjusting region 6a, and forming a matrix 2c and scattering particles 2b in the second light adjusting region 6b, wherein the scattering particles 2b are dispersed in the matrix 2c; and forming a sixth substrate 62 on the light adjusting function layer 63.

In the above embodiment, the act S2 may specifically include: a planar electrode, i.e., a fifth substrate 61, is coated on a side of the second substrate 2 of the liquid crystal display panel 10; a polymer dispersed liquid crystal 2a is coated on the third substrate 41, a UV polymerization treatment is performed on the polymer dispersed liquid crystal 2a through a mask plate, a mixture of the polymer dispersed liquid crystal 2a in an unpolymerized region (the second light adjusting region 6b) is removed using a solvent, a jelly with the scattering particles 2b is coated so as to fill a region without the polymer dispersed liquid crystal 2a, and a thermally polymerization treatment is performed on the matrix 2c and the scattering particles 2b of the second light adjusting region 6b to make them cured and bonded, finally forming a second liquid crystal layer 43; and a flexible planar electrode, i.e., the sixth substrate 62, is attached on the second liquid crystal layer 43.

An embodiment of the present disclosure further provides a display apparatus, which includes the above display module.

The display module provided by the embodiment of the present disclosure includes a liquid crystal display panel and a light scattering layer. Firstly, the liquid crystal display panel uses ambient light as a light source, and by adjusting a helical pitch of a cholesteric liquid crystal, it may be achieved that a color of light reflected by the cholesteric liquid crystal is controlled to reflect visible light with different colors under an action of different electric fields, thereby achieving color display and avoiding damage of blue light to human eyes; secondly, a color film and a polarizer are no longer disposed in the liquid crystal display panel, which reduces a manufacturing cost of the display module while achieving color display with high color gamut; and finally, a light scattering layer is configured to scatter light reflected by the liquid crystal display panel, so as to increase an exit angle of the reflected light of the display module, thus having a relatively high light utilization rate and improving a display effect of the display module. Specifically, the light scattering layer may be composed of a matrix and scattering particles, and light is scattered through scattering particles with a certain size and concentration to increase the exit angle of the reflected light of the display module; the light scattering layer may also include a polymer dispersed liquid crystal configured to switch between a scattering state and a transmission state in response to control of an electric field; and the light scattering layer may also include both scattering particles and the polymer dispersed liquid crystal to enlarge a range of the exit angle of the light reflected by the display module, so that a viewing angle of the display module is increased, which improves a display effect of the display module.

The above display apparatus may be any product or component with a display function, such as electronic paper, a mobile phone, a tablet computer, a television, a display, a notebook computer, a digital photo frame, and a navigator, which is not limited in the present disclosure.

It is to be understood that the above implementation modes are only exemplary implementation modes adopted for illustrating principles of the present disclosure, however the present disclosure is not limited thereto. For those of ordinary skill in the art, various modifications and improvements may be made without departing from the spirit and substance of the present disclosure, and these modifications and improvements are also considered to be within the scope of the present disclosure.

The invention claimed is:

1. A display module, comprising:
 a liquid crystal display panel, comprising a first substrate, a second substrate, and a first liquid crystal layer, wherein the first substrate is disposed opposite to the second substrate, the first liquid crystal layer is located between the first substrate and the second substrate, the first liquid crystal layer comprises a cholesteric liquid crystal, and the cholesteric liquid crystal is configured to have a conical helix texture when an electric field is applied, to reflect light matched with a helical pitch of the conical helix texture; and
 a light scattering layer, which is located on a side of the liquid crystal display panel and is configured to be able to scatter light reflected by the liquid crystal display panel,
 wherein the light scattering layer comprises a scattering layer, the scattering layer is divided into a first light adjusting region and a second light adjusting region located in a same plane, and the scattering layer comprises a third substrate, a fourth substrate, and a light adjusting function layer, wherein the third substrate is disposed opposite to the fourth substrate, the light adjusting function layer is located between the third substrate and the fourth substrate, and the light adjusting function layer comprises a polymer dispersed liquid crystal located in the first light adjusting region, and a matrix and scattering particles located in the second light adjusting region, wherein the scattering particles are dispersed in the matrix.

2. The display module according to claim 1, wherein the liquid crystal display panel is divided into a plurality of pixel regions, a pixel region comprises a plurality of sub-pixel regions, the first substrate comprises a plurality of pixel electrodes corresponding to the sub-pixel regions one by one, and a pixel electrode is located in a corresponding sub-pixel region; and
 for any one of the sub-pixel regions, an orthographic projection of one portion of the sub-pixel region on the scattering layer is located in the first light adjusting region, and an orthographic projection of the other portion of the sub-pixel region on the scattering layer is located in the second light adjusting region.

3. The display module according to claim 2, wherein the plurality of pixel regions in the liquid crystal display panel are arranged in an array along a first direction and a second direction;
 for any one of the sub-pixel regions, a portion, which is located in the first light adjusting region, of an orthographic projection of the sub-pixel region on the scattering layer is a first portion, and a portion, which is located in the second light adjusting region, of the orthographic projection of the sub-pixel region on the scattering layer is a second portion;
 the first portion and the second portion are arranged along the first direction;
 or the first potion and the second portion are arranged along the second direction;
 or the first portion and the second portion are arranged along a third direction, wherein the third direction intersects with both the first direction and the second direction.

4. The display module according to claim 3, wherein for any one of the sub-pixel regions, a portion, which is located in the first light adjusting region, of an orthographic projection of the sub-pixel region on the scattering layer has an area of a first orthographic projection, and a portion, which is located in the second light adjusting region, of the orthographic projection of the sub-pixel region on the scattering layer has an area of a second orthographic projection; and
 a ratio of the area of the first orthographic projection to the area of the second orthographic projection is 0.8 to 1.2.

5. The display module according to claim 2, wherein for any one of the sub-pixel regions, a portion, which is located in the first light adjusting region, of an orthographic projection of the sub-pixel region on the scattering layer has an area of a first orthographic projection, and a portion, which is located in the second light adjusting region, of the orthographic projection of the sub-pixel region on the scattering layer has an area of a second orthographic projection; and a ratio of the area of the first orthographic projection to the area of the second orthographic projection is 0.8 to 1.2.

6. The display module according to claim 2, wherein a diameter of the scattering particles is 3 μm to 10 μm.

7. The display module according to claim 1, wherein a diameter of the scattering particles is 3 μm to 10 μm.

8. The display module according to claim 1, wherein a material of the scattering particles comprises silicon dioxide.

9. The display module according to claim 1, wherein a concentration of the scattering particles in the matrix is 3% to 15%.

10. A preparation method of a display module, wherein the display module is a display module according to claim 1, and the preparation method comprises:

providing a liquid crystal display panel, wherein the liquid crystal display panel comprises a first substrate, a second substrate, and a first liquid crystal layer, the first substrate is disposed opposite to the second substrate, the first liquid crystal layer is located between the first substrate and the second substrate, the first liquid crystal layer comprises a cholesteric liquid crystal, and the cholesteric liquid crystal is configured to have a conical helix texture when an electric field is applied, to reflect light matched with a helical pitch of the conical helix texture; and forming a light scattering layer on a side of the liquid crystal display panel, wherein the light scattering layer is configured to be able to scatter light reflected by the liquid crystal display panel, wherein the act of forming the light scattering layer comprises:

forming a third substrate;

forming a light adjusting function layer on the third substrate, wherein the act of forming the light adjusting function layer comprises: forming a polymer dispersed liquid crystal in a first light adjusting region, and forming a matrix and scattering particles in a second light adjusting region, wherein the scattering particles are dispersed in the matrix; and forming a fourth substrate on the light adjusting function layer.

11. A display apparatus, comprising a display module according to claim 1.

* * * * *